Patented Apr. 6, 1948

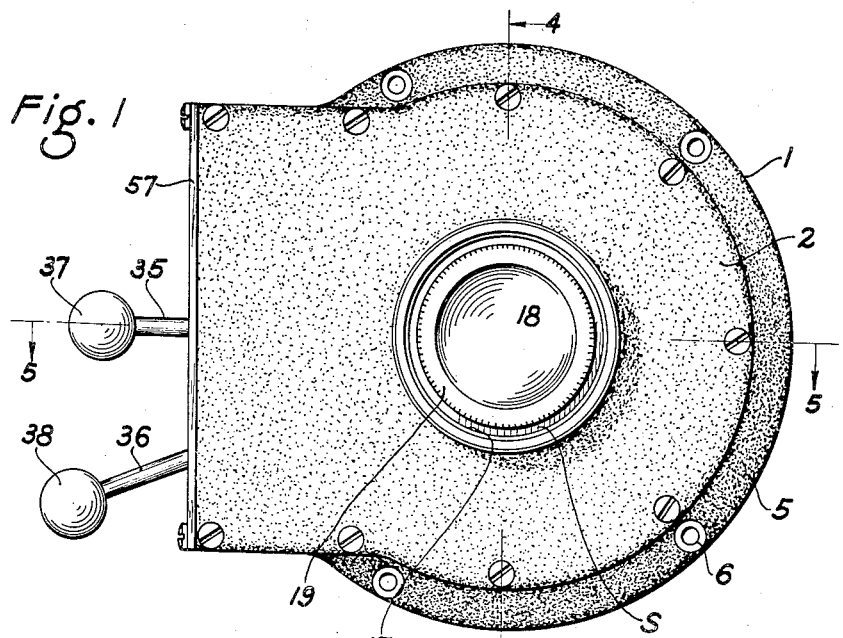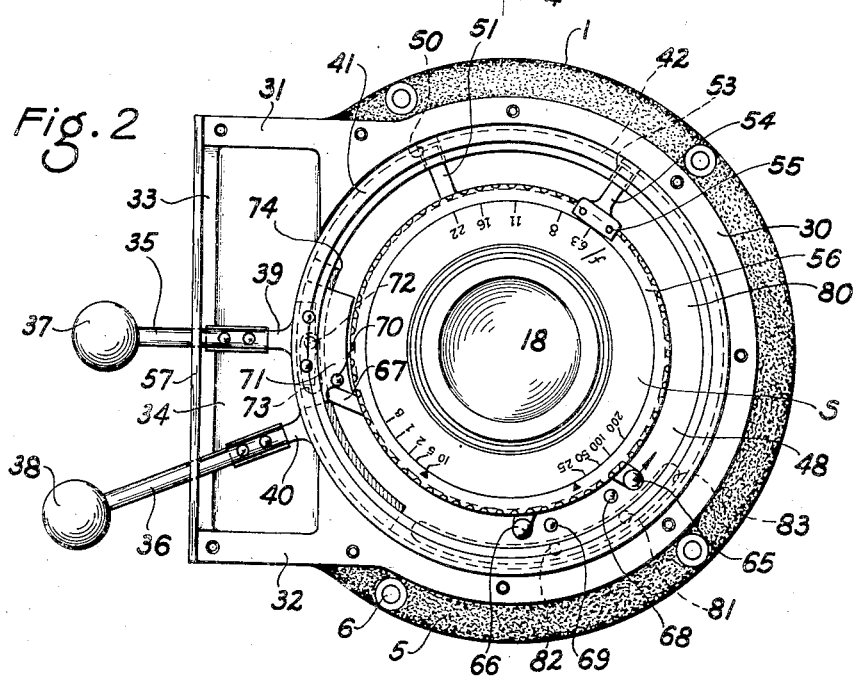

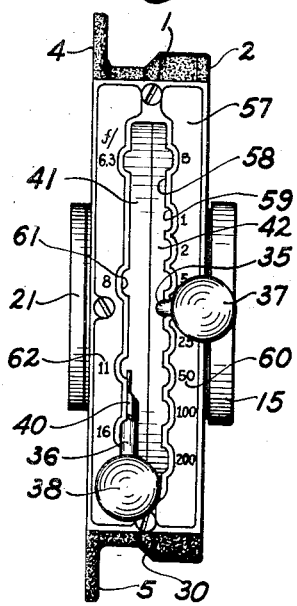

2,439,087

UNITED STATES PATENT OFFICE 2,439,087

PROTECTIVE CASING FOR ENCLOSING PHOTOGRAPHIC SHUTTERS TO EXCLUDE MOISTURE AND DIRT THEREFROM

Douglass C. Harvey, Rochester, N. Y., assignor to Eastman Kodak Company, Rochester, N. Y., a corporation of New Jersey Application June 14, 1945, Serial No. 599,339

6 Claims. (Cl. 95—53)

This invention relates to photography and more particularly to a protective casing for camera shutters. One object of my invention is to provide a means for adequately protecting a camera shutter against moisture, dirt, and dust. Another object of my invention is to provide a protective casing for shutters in which a standard shutter may be mounted, and in which the shutter may be protected against the elements, and to provide a means carried by the casing for operating the various shutter adjustments. Another object of my invention is to provide a shutter casing in which a standard shutter and objective may be mounted, the protective casing being provided with an accurately-formed plane surface which is so adjusted relative to the focal length of the camera objective that the casings may be interchangeably mounted upon an accurately-formed lens board without the necessity of re-focusing the camera. A still further object of my invention is to provide a protective casing for shutters designed particularly for use around salt water where it is normally difficult to prevent spray and water from striking and corroding camera shutter parts, and to provide a shutter structure which is particularly suitable for naval operations. Other objects will appear from the following specification, the novel features being particularly pointed out in the claims at the end thereof.

It has been particularly difficult in reconnaissance work and especially in naval reconnaissance, to protect the photographic lens and shutter of a camera under the extremely difficult conditions under which photographic equipment is used and perhaps the most delicate part of the usual camera is the shutter and objective. Salt spray, particularly in the tropics, causes rapid deterioration of a camera shutter, even when the parts are made of the more or less standard stainless steel, because it frequently happens that the gearing controlling the shutter speeds, and other parts of the shutter, are affected to such an extent that reliable exposures cannot continue to be produced. It is also very desirable to provide some way of interchanging objectives and shutters without re-focusing the camera in case something does go wrong with the shutter so that substitute shutters can quickly and easily be placed on the photographic apparatus. My present invention is particularly directed to provide such an interchangeable protective casing for shutters which will not only greatly prolong the life of a shutter used under the most difficult conditions, but which will also provide a unit which can be readily and quickly interchanged in the field without danger of altering the focus of the completed camera.

Coming now to the drawings wherein like reference characters denote like parts throughout:

Fig. 1 is a front elevation of a protective shutter casing carrying a standard type of shutter, the casing being constructed in accordance with and embodying a preferred form of my invention;

Fig. 2 is a view similar to Fig. 1 but with the casing cover removed;

Fig. 3 is a side elevation of the shutter casing shown in the preceding figures;

Fig. 4 is a sectional view taken through the shutter casing shown in Fig. 1 on line 4—4 thereof and showing a standard shutter in elevation;

Fig. 5 is a section taken on line 5—5 of Fig. 2 showing the shutter casing without a shutter mounted therein;

Fig. 6 is an enlarged fragmentary detail showing the interlocking relationship of the shutter casing rings;

Fig. 7 is an enlarged perspective view of a shutter leaf opening member removed from the shutter casing.

My casing consists broadly of a housing or closure for a standard type of shutter in which the standard shutter and its objective can be focused relative to a focal plane so that an accurately-finished plane surface on the housing will bear an exact relation to the focal length of an objective enabling an operator to merely attach this housing to a camera support having an accurately-formed surface thereon, making different lenses and shutters prepared for the purpose interchangeable. The improved protective casing for shutters preferably completely encloses the shutter and is provided with a series of intelocking substantially moisture and dust-proof operating members so arranged that the operating parts of a standard shutter mounted in the casing can be adjusted by adjusting members extending outside of the casing. While the present embodiment of my invention was particularly designed for a special type of camera shown in my copending application Serial No. 700,560, filed October 1, 1946, and entitled Reflex type camera, nevertheless it is obvious that such a protective shutter casing is equally valuable for various different types of cameras.

As indicated in the drawings, the present embodiment of my invention comprises a casing designated broadly as 1 having a front cover plate 2 and including a rear wall or plate 3. This wall is provided with an accurately-formed surface 4 which has a definite relationship to the focal plane of a camera on which the shutter S and its objective are to be used. The shutter wall 3 carries an outwardly extending flange 5 provided with a series of apertures 6—here shown as 4 in number—through which screws 7 may pass into threaded apertures 8 in a lens board 9 as indicated in Fig. 4. The lens board 9 is provided with an accurately-formed surface 10 bearing a definite relationship to the focal plane of the camera. The screws 7 are preferably provided with knobs 11 by which they may be turned until the annular shoulders 12 engage the flange 5 to hold the protective casing tightly on the lens board 9. In order to change lenses and shutters, it is only necessary to unscrew the four knobs 11, place another unit in place and attach it by these screws. This, of course, can be done very rapidly and may be carried out under difficult conditions if necessary.

The protective casing cover plate 2 is provided with an outwardly extending flange 13 threaded at 14 to receive a lens cap 15, this cap also being threaded at 16 to form a closure for an axial opening 17 through which light rays may pass in making an exposure. The front lens element 18 is carried by a cell 19 which in turn is carried by the shutter S and the shutter S has a rearwardly extending tubular member 20 to which a ring 21 is attached to hold the shutter on the rear plate 3 of the casing against the annular rim 22 thereof.

For one particular embodiment the shutter S is mounted in the casing 1 in a factory set-up which includes turning down the shoulder 22 to take care of the exact focal length of the lens carried by the shutter S so as to position the shutter in the protective casing in the proper location. If necessary, shims may be placed between the rear wall 23 of the shutter casing and the rear wall 3 of the protective casing. The rear wall 3 of the protective casing includes an opening 24, the openings 24 and 17 being axially aligned as shown in Fig. 4.

The cover plate 2 of the protective casing is provided with a boss 25 and a grease felt washer 26 of the desired thickness is placed between the boss 25 and the front wall 27 of the shutter S. This forms a dust and moisture-tight closure when the lens cap 15 is unscrewed and the shutter and objective are ready for use.

The shutter casing includes, as best shown in Fig. 2, an arcuate wall 30 which extends between the rear plate 3 and the front plate 2 which wall substantially encloses the shutter. However, there are two walls 31 and 32 extending from the arcuate wall 30 outwardly to a wall 33, thus providing an opening 34 through which a pair of generally radially extending arms 35 and 36 may extend from the inside to the outside of the protective casing. Arm 35 includes an operating handle 37 and arm 36 includes an operating handle 38. Each of these arms, as best shown in Fig. 5, is mounted on a leaf spring, arm 35 on a leaf spring 39 and arm 36 on a leaf spring 40, these leaf springs being flexible in a direction along the axis of the camera objective and being relatively inflexible when moved in a circumferential direction. Arm 36 is attached to a ring 41 and arm 35 is attached to a ring 42, these two rings extending completely around the shutter S and being adapted to move in a track or slideway 43 formed in the arcuate wall 30. The rings 41 and 42 preferably include interlocking shoulders 44 engaging each other. Ring 42 has an interlocking flange 45 which interlocks with the flange 46 in the cover 2. The cover 2 holds the rings 41 and 42 in interlocked relation against the corner 47 and also retains a third ring 48 which is mounted to turn in a slideway or recess 49 in the rear wall 3 of the casing, as best shown in Fig. 5. These rings form a substantially water and moisture-tight cover for a shutter S and, in addition, they may be independently moved by the handles 37 and 38 for adjusting shutter parts.

Referring to Fig. 2 the diaphragm adjusting lever 36 is connected to the ring 41, this ring including a slot or aperture 50 which receives a bracket 51 for transmitting motion from the ring 41 to the usual diaphragm ring or adjusting member carried by the shutter S. This diaphragm adjusting member 52 is shown in Fig. 4.

The handle 37 is connected to the ring 42, this ring having a notch 53 carrying a bracket 54 connected by rivets 55 to the shutter speed adjusting ring 56.

Referring to Fig. 3 it will be noticed that the wall 33 is covered by a plate 57 and this plate includes a central slot 58 through which the levers 35 and 36 may project extending from the inside to the outside of the protective casing. In the present embodiment, the plate 57 can conveniently be formed of an etched plate and it is provided with a series of notches 59 on one side together with graduations 60 which are positioned into units of shutter speed and on the opposite side there are notches 61 graduated into unit 62 indicating diaphragm openings. Since the leaf springs 39 and 40 are so arranged as to give a spring bias to the levers 35 and 36 so that these levers will engage the respective notches in their scale plates, the notches can be used for retaining the setting levers 37 and 38 in a predetermined or set position. Thus, in Figure 3 the shutter diaphragm is set for f/16 and the shutter speed is set for $\tfrac{1}{10}$ of a second. The leaf springs 39 and 40 enable an operator to readily move either operating handle so that it may move freely through the slot 58 and so that when released the handle will automatically engage the notch to which it is set. However, the leaf springs 39 and 40 as shown in Fig. 2 are quite wide with respect to their thickness so that they are substantially inflexible when the arms are moved in a circumferential direction.

The ring 48, best shown in Figs. 4 to 6 inclusive, carries a plurality of pins extending inwardly and outwardly from the ring for setting and releasing the shutter. The shutter S shown in this drawing is a shutter of the type shown in Patent 2,099,866, Riddell, granted November 23, 1937, and it is equipped with a shutter blade opening device similar to Patent 2,206,132, Stewart, granted July 2, 1940, and with a shutter speed regulating mechanism similar to Patent 2,165,137, Green, granted July 4, 1937. While this shutter was selected for the present embodiment of my invention obviously I can provide a shutter protective casing for any known type of shutter.

The shutter S as indicated in Fig. 2 is provided with a shutter trigger 65 with a shutter setting lever 66 and with a lever 67 for opening the shutter blades for focusing without altering the shutter speed adjustment. Lever 65, which is the trigger, may be released when pin 68 carried by ring 48 is turned in the direction shown by the arrow. When the ring 48 is moved in a reverse direction, the setting lever 66 may be engaged and moved by pin 69. The blade opening lever 67 may be operated by a pin 70 but this pin is not carried by the ring 48 but is carried by the slidably mounted arcuate segment 71 shown in Fig. 7 and in Fig. 5. In the latter figure a pin 72 is shown as extending upwardly through a slot 73 in the rear wall 3 and the arcuate slidable member 71 extends through a cut-out portion 74 between the ring 48 and the ring 41. The extent of this arcuate cut-out portion 74 is shown in Fig. 2 and it is just sufficient to permit the pin 70 to be moved the necessary distance to operate the blade opening lever 67. It will be noticed that the slot 74 does not in any way open up the inner shutter carrying chamber 80 to the outer chamber 34 through which the levers pass so that a seal is still maintained between the exterior and the interior of the casing. The ring 48 includes a pin 81 and a second pin 82 mounted adjacent to the pins 68 and 69 but extending outwardly from the shutter through the slot 83 best shown in Fig. 2. The pins 72, 81, and 82 extend into a camera supporting the lens board 9 and are adapted to engage suitable mechanism thereof which can be operated to move these pins to open the blades for focusing, set the shutter and release the shutter preferably in sequential relation as indicated in my copending application above referred to.

It will be noticed that the construction of my improved shutter protective casing is such that the rear of the shutter S is protected by the camera body and the connection between wall 3 and the lens board 9. The front of the shutter S is protected from the grease-felt gasket 26 outwardly and the remaining portion of the shutter lies in the chamber 80 which is completely sealed by the edge walls of the casing, the rings 41, 42, and 48, and the cover plate 2. While the chamber 34 includes the slot 58 in the wall 57, nevertheless the inside wall of this chamber formed by portions of the rings 41 and 42 are adequately sealed against any moisture, dust, or dirt which may enter the slot 58. The front lens element 18 is of course exposed when the lens cap 15 is removed but this lens cell screws tightly into the shutter casing and is made of a non-corrodable material so that neither the cell nor the glass is readily injured during the short time it is exposed in taking pictures.

By providing interchangeable units including protective casings, shutters, and lenses, which can be readily placed on, or removed from, a lens board, and by providing a unit which is substantially water and dust tight, I have overcome the many difficulties which occur, particularly in warm, moist climates and in naval reconnaissance which usually occur with standard types of photographic equipment. While my improved protective casing for shutters must be altered somewhat for different types of shutters now on the market, this can readily be done. Usually, it only requires a re-positioning of the operating pins 68, 69, and 70, and perhaps slightly different mounts for the shutter in the protective casings. However, these alterations can be accomplished by any skilled mechanic.

While I have described and illustrated a preferred embodiment of my invention, it is obvious that changes can readily be made therein without departing from my invention as defined in the following claims.

I claim:

1. A protective casing for the reception of a complete shutter including a speed-setting member, a diaphragm-setting member and carrying lens elements; the protective casing comprising a housing, front and back plates in the housing, axially-aligned openings for the reception of said lens elements in the front and back plates of the protective casing, an annular guideway in the housing, rings extending about the axially-aligned openings and mounted to turn in the annular guideway, operable connections, one between one ring and said shutter speed-setting member, and one between the other ring and said shutter diaphragm-setting member, interengaging flanges on the rings and guideway, generally radially-extending arms, one carried by each ring and extending from the protective casing for moving the rings, said housing enclosing the greater part of said rings.

2. A protective casing for the reception of a complete shutter including an operating lever and setting members, the protective casing comprising, in combination, a front and back wall, each having axially-aligned lens openings, an outer edge wall extending substantially around and supporting the front and back walls, an inner arcuately-shaped wall extending around the axially-aligned lens openings and forming a first slideway, rings mounted to turn in said slideway and completely encircling the axially-aligned lens openings, handles, one for manually operating each ring, a second annular slideway in the protective casing, an annular member oscillatably mounted therein, means for actuating the annular member extending through the casing, said photographic shutter including two setting members and an operating lever adapted to be enclosed in the protective casing, means carried by the annular slidable member for engaging and moving the operating lever of the photographic shutter, means carried by one ring for engaging and moving one shutter-setting member, means carried by the other ring for engaging and moving the other setting member.

3. A protective casing for the reception of a shutter comprising, in combination, a front and a back wall, each having axially-aligned lens openings, an outer edge wall extending substantially around and supporting the front and back walls, an inner arcuately-shaped wall extending around the axially-aligned lens openings and forming a first slideway, rings mounted to turn in said slideway and completely encircling the axially-aligned lens openings, handles, one for manually operating each ring, a second annular slideway in the protective casing, an annular member oscillatably mounted therein, means extending through the casing for operating the annular slidable member, said photographic shutter including speed and diaphragm setting members and a setting lever and a trigger adapted to be enclosed in the protective casing, means carried by the annular slidable member for engaging and moving the setting lever and the trigger of the photographic shutter, and means for operably connecting one ring to the speed and the other ring to the diaphragm setting members.

4. A protective casing for shutters comprising, in combination, a front and a back wall, each having axially-aligned lens openings, an outer edge wall extending substantially around and supporting the front and back walls, an inner arcuately-shaped wall extending around the axially-aligned lens openings and forming a first slideway, two rings mounted to turn in said slideway and completely encircling the axially-aligned lens openings, handles, one for manually operating each ring, a second annular slideway in the protective casing, an annular member oscillatably mounted therein, said photographic shutter including operating levers for setting and tripping the shutter, and operating members for adjusting the shutter speed and the diaphragm opening, said shutter being adapted to be totally enclosed in said protective casing, means carried by the annular slidable member for engaging and moving the operating levers of the photographic shutter, an opening in the second annular slideway to the outside of the protective casing sealed by the annular slidable member inside of the protective casing, a projection extending through the opening and connected to the annular slidable member for moving the latter from the exterior of the casing, and means for operably connecting one ring to the speed and the other ring to the diaphragm-setting members.

5. A protective casing for shutters comprising, in combination, a front and a back wall, each having axially-aligned lens openings, an outer edge wall extending substantially around and supporting the front and back walls, an inner arcuately-shaped wall extending around the axially-aligned lens openings and forming a first slideway, two rings mounted to turn in said slideway and completely encircling the axially-aligned lens openings, a second annular slideway in the protective casing, an annular member oscillatably mounted therein and including a pin, an aperture in said casing through which said pin extends for operating the annular oscillatably mounted member therein, said photographic shutter including speed and diaphragm-setting members and operating levers for setting and tripping the shutter, said photographic shutter being adapted to be totally enclosed in and protected by the casing, means carried by the oscillatably mounted member for engaging and moving the operating levers for setting and tripping the photographic shutter, means operably connecting one ring to the speed-setting member and the other ring to the diaphragm-setting member, said casing, rings, and annular slidable member all including interengaging relatively slidable flanges for sealing the photographic shutter inside the protective casing, and means for moving the rings.

6. A protective casing for shutters comprising, in combination, a front wall and a back wall, each having axially-aligned lens openings, an outer edge wall extending substantially around and supporting the front and back walls, an inner arcuately-shaped wall extending around the axially-aligned lens openings and forming a first slideway, two rings mounted to turn in said slideway and completely encircling the axially-aligned lens openings, a second annular slideway in the protective casing, an annular member oscillatably mounted therein, a projection from said annular member extending through a slot in the casing to the exterior thereof for operating the annular slidable member, said photographic shutter including a speed-setting member and a diaphragm-setting member and operating levers, one for setting the shutter and the other for releasing the shutter, said photographic shutter and its operating members and levers being adapted to be totally enclosed in the protective casing, means carried by the annular oscillatably mounted member for engaging and moving the operating levers of the photographic shutter for setting and tripping the shutter, means for connecting one ring to the shutter speed-setting member and means for connecting the other ring to the shutter diaphragm-setting member, means for moving the rings, said casing, rings, and annular slidable member all including interengaging relatively slidable flanges for sealing the shutter inside the protective casing, said shutter supporting lens elements extending into the axially-aligned openings in the front and back walls of the protective casing, and means for sealing the axially-aligned openings and the shutter forming a substantially watertight connection therebetween.

DOUGLASS C. HARVEY.

REFERENCES CITED

The following references are of record in the file of this patent:

UNITED STATES PATENTS

| Number | Name | Date |
| --- | --- | --- |
| 871,654 | Watkins et al. | Nov. 19, 1907 |
| 1,572,345 | Wollensak | Feb. 9, 1926 |
| 2,222,298 | Nerwin | Nov. 19, 1940 |
| 2,333,788 | Green et al. | Nov. 9, 1943 |
| 2,380,610 | Pignone | July 31, 1945 |